(12) United States Patent
Edmonds

(10) Patent No.: US 6,552,306 B1
(45) Date of Patent: Apr. 22, 2003

(54) WOK

(75) Inventor: Nicholas Graham Edmonds, Campsie (AU)

(73) Assignee: Sunbeam Corporation Limited, Campsie (AU)

( * ) Notice: Subject to any disclaimer, the term of this patent is extended or adjusted under 35 U.S.C. 154(b) by 0 days.

(21) Appl. No.: 09/707,089

(22) Filed: Nov. 6, 2000

(30) Foreign Application Priority Data

Feb. 16, 2000 (AU) .................................................. PQ5679

(51) Int. Cl.⁷ .......................... A47J 27/02; A47J 37/10; H05B 3/68; H05B 3/22; H05B 3/28
(52) U.S. Cl. ........................ 219/438; 219/439; 219/530; 219/536
(58) Field of Search ................................ 219/430, 432, 219/438, 439, 530, 536, 540, 544; 99/447

(56) References Cited

U.S. PATENT DOCUMENTS

| | | | | |
|---|---|---|---|---|
| 3,505,498 A | * | 4/1970 | Shevlin | 219/432 |
| 3,725,645 A | * | 4/1973 | Shevlin | 219/432 |
| 3,875,370 A | * | 4/1975 | Williams | 219/432 |
| 3,909,591 A | * | 9/1975 | Ulam | 219/438 |
| 3,919,763 A | * | 11/1975 | Ulam | 219/436 |
| 4,024,377 A | * | 5/1977 | Henke | 219/439 |
| 4,399,351 A | * | 8/1983 | Koff | 219/430 |
| 4,458,139 A | * | 7/1984 | McClean | 219/432 |
| 4,555,616 A | * | 11/1985 | O'Brien | 219/432 |
| 5,129,314 A | | 7/1992 | Hu | |
| 5,239,916 A | | 8/1993 | Hu | 99/422 |
| 5,539,185 A | * | 7/1996 | Polster | 219/439 |
| 5,778,768 A | * | 7/1998 | McClean | 99/422 |

FOREIGN PATENT DOCUMENTS

| | | | |
|---|---|---|---|
| AU | 65540/96 | 4/1997 | .......... A47J/037/10 |
| DE | 1 937 875 | 2/1970 | |
| DE | 89 02 013 | 3/1990 | |
| EP | 0 208 922 | 1/1987 | |
| FR | 2 357 220 | 2/1978 | |
| GB | 743 322 | 1/1956 | |
| GB | 2 083 741 A | 3/1982 | ............. A4A/A4D |

* cited by examiner

*Primary Examiner*—Joseph Pelham
(74) *Attorney, Agent, or Firm*—Hamilton, Brook, Smith & Reynolds, P.C.

(57) ABSTRACT

A cooking appliance (wok) (10) having a stainless steel bowl (11) to which there is attached a heating base (15). Embedded in the heating base (15) is an electric heating element (17). The bowl (11) is formed of stainless steel and is of an arcuate configuration.

8 Claims, 4 Drawing Sheets

WOK

RELATED APPLICATION

This application claims priority to Australian Provisional Application No. PQ5679 filed Feb. 16, 2000, the entire teachings of which are incorporated herein by reference.

BACKGROUND

A properly heated wok has heat applied to not only the bottom portion of the wok but also a substantial portion of the side wall. Woks which have a stainless steel bowl and are provided with their own electric heating element have a flattened base to which the heating element is secured. These previous woks have the disadvantage that heat is not applied to a substantial portion of the side wall of the stainless steel bowl.

SUMMARY

The present invention provides a cooking appliance including a stainless steel bowl having an inner surface and an outer surface. The outer surface is at least partly non-planar so as to have a non-planar portion including a side portion of said outer surface. A heating base is fixed to the outer surface so as to cover the non-planar portion. The heating base includes an electric heating element, which when activated, causes the base to heat the non-planar portion.

In preferred embodiments, the heating base is a cast body within which the heating element is embedded. The cast body is secured to the outer surface of the bowl. In one embodiment, the bowl and the outer surface of the bowl are arcuate.

In another embodiment, the bowl has a generally flat floor and a side wall extending therefrom. The side wall is joined to the floor by a curved portion. The heating element is secured to the floor and side wall. In one embodiment, the side wall is inclined relative to the floor. In another embodiment, the side wall is generally perpendicular to the floor.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
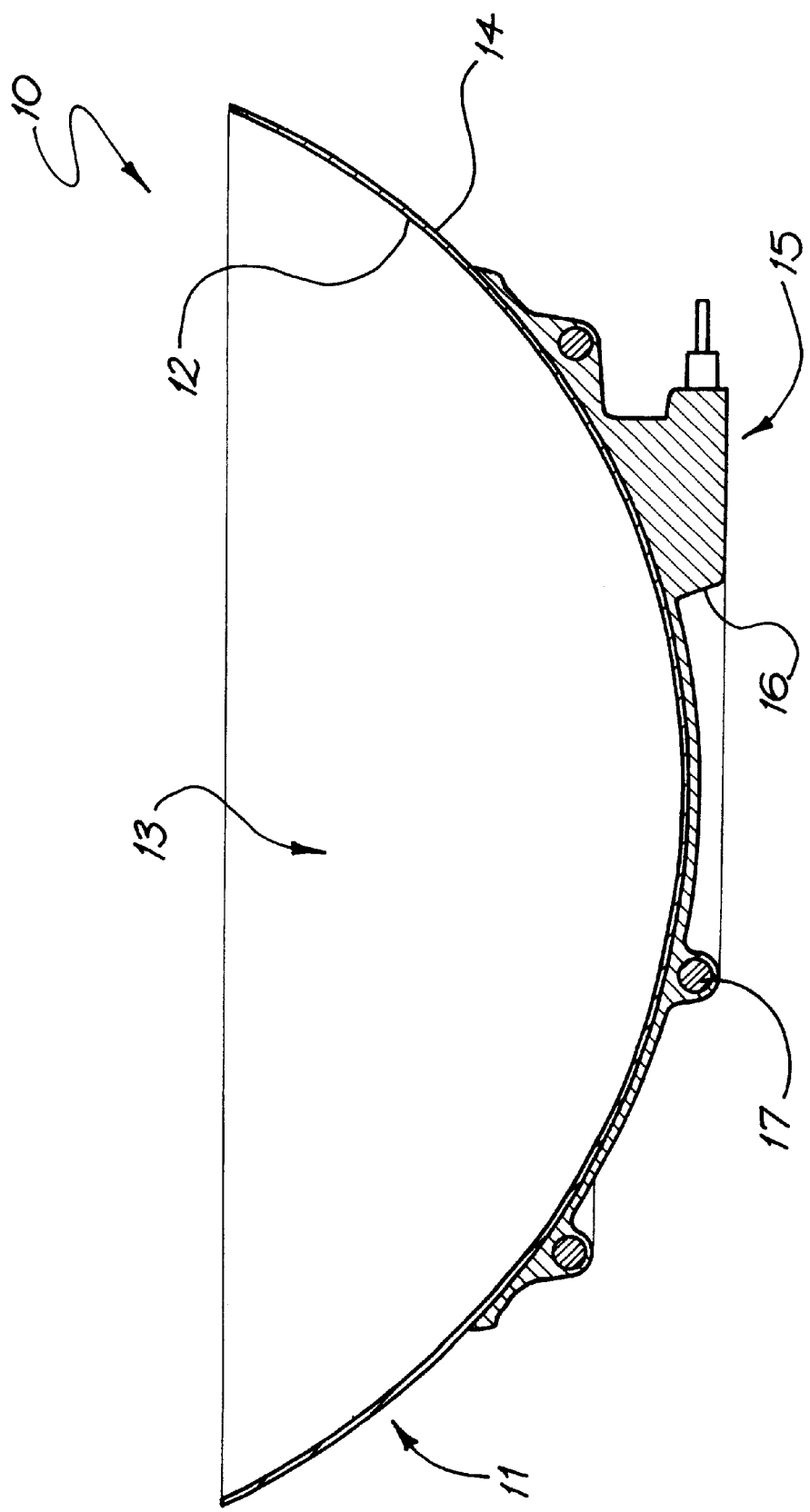
FIG. 1 is a schematic section side elevation of a wok.
Figure 2:
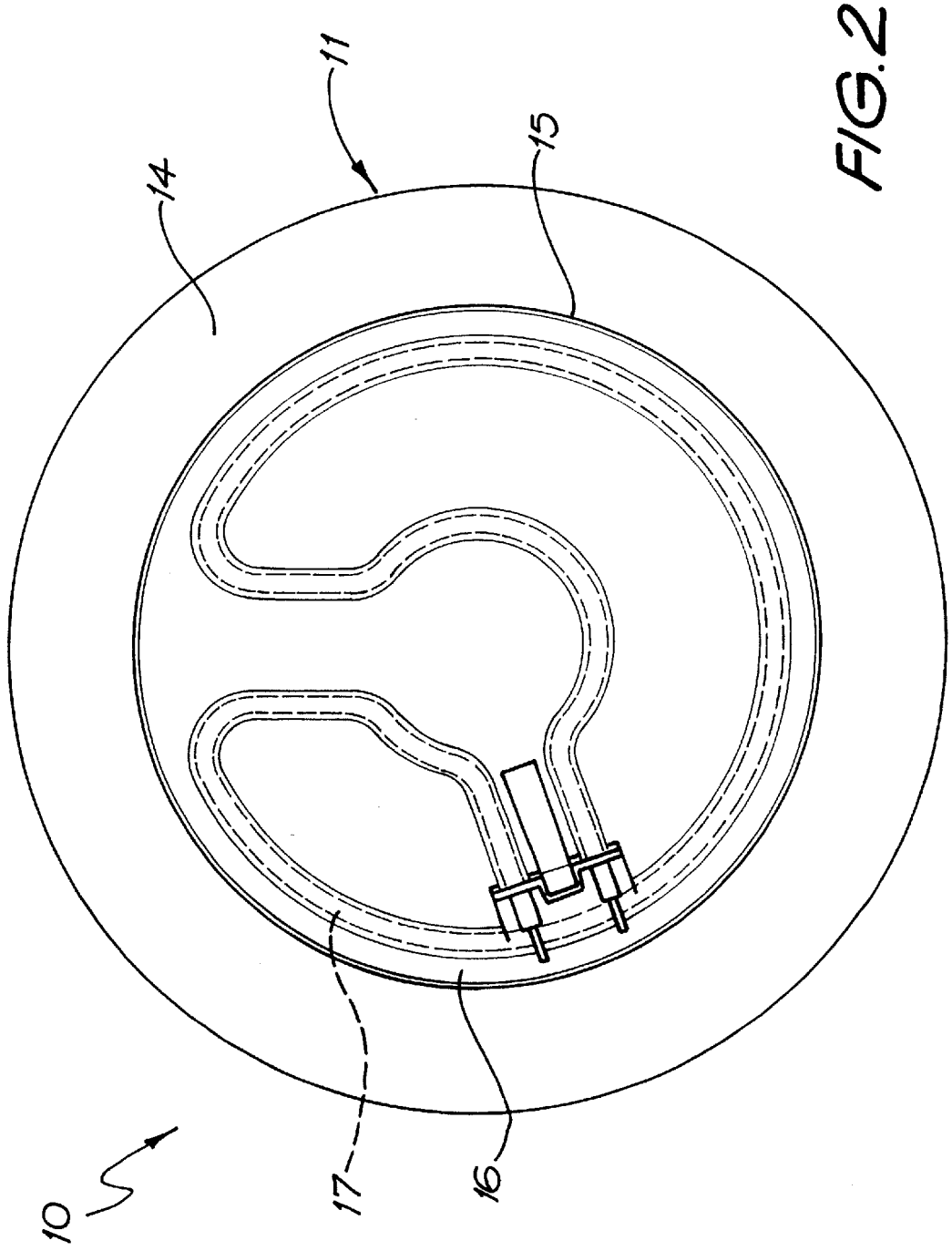
FIG. 2 is a schematic bottom plan view of the wok of FIG. 1.

In FIGS. 1 to 4 of the accompanying drawings, there is schematically depicted a variety of cooking utensils. More particularly, the embodiment of FIGS. 1 and 2 illustrates a wok 10. The wok 10 includes a stainless steel bowl 11 which is arcuate in configuration. The bowl 11 has an inner concave surface 12 providing a chamber 13 within which food is cooked. The curved convex outer surface 14 is non-planar and is fixed to a heating base 15. The heating base 15 includes an aluminium cast body 16 within which there is embedded an electric heating element 17. The body 16 is preferably cast aluminium, with the aluminium being relatively pure (at least about 99.8%). In this embodiment, the base 15 is brazed to the bowl 11. However, in that respect it should be appreciated that other means of fixing the base 15 to the bowl 11 may be employed such as threaded fasteners and adhesives.

As can be seen from FIG. 1, the surface 14 is non-planar, more particularly it is curved. The surface 13 and 14 of this embodiment are each preferably a portion of a sphere.

Preferably, the base 15 extends about half the height of the bowl 11 so as to cover at least a portion of the side of the bowl 11.

Figure 3:
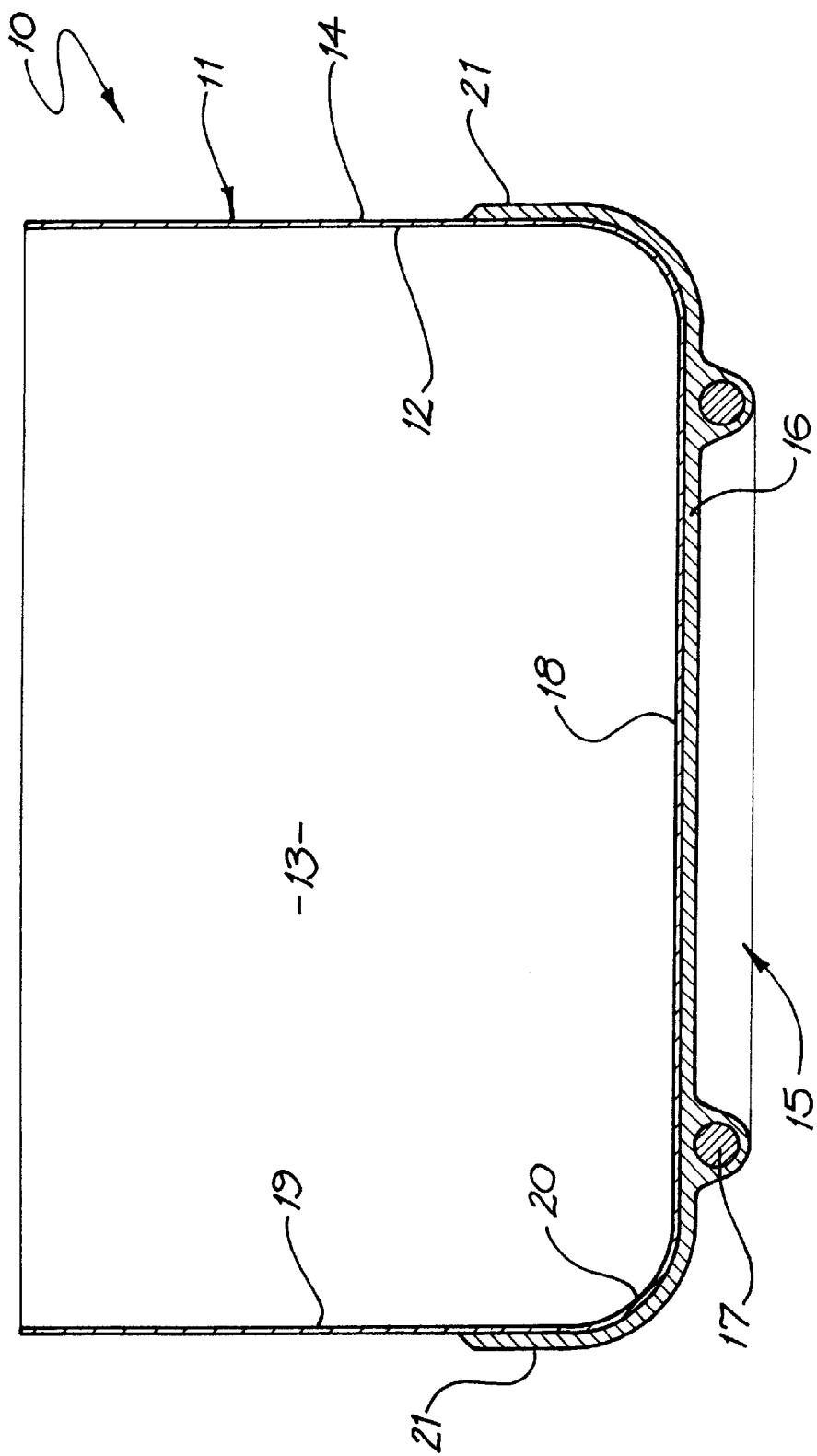
FIG. 3 is a schematic section side elevation of a cooking utensil.
Figure 4:
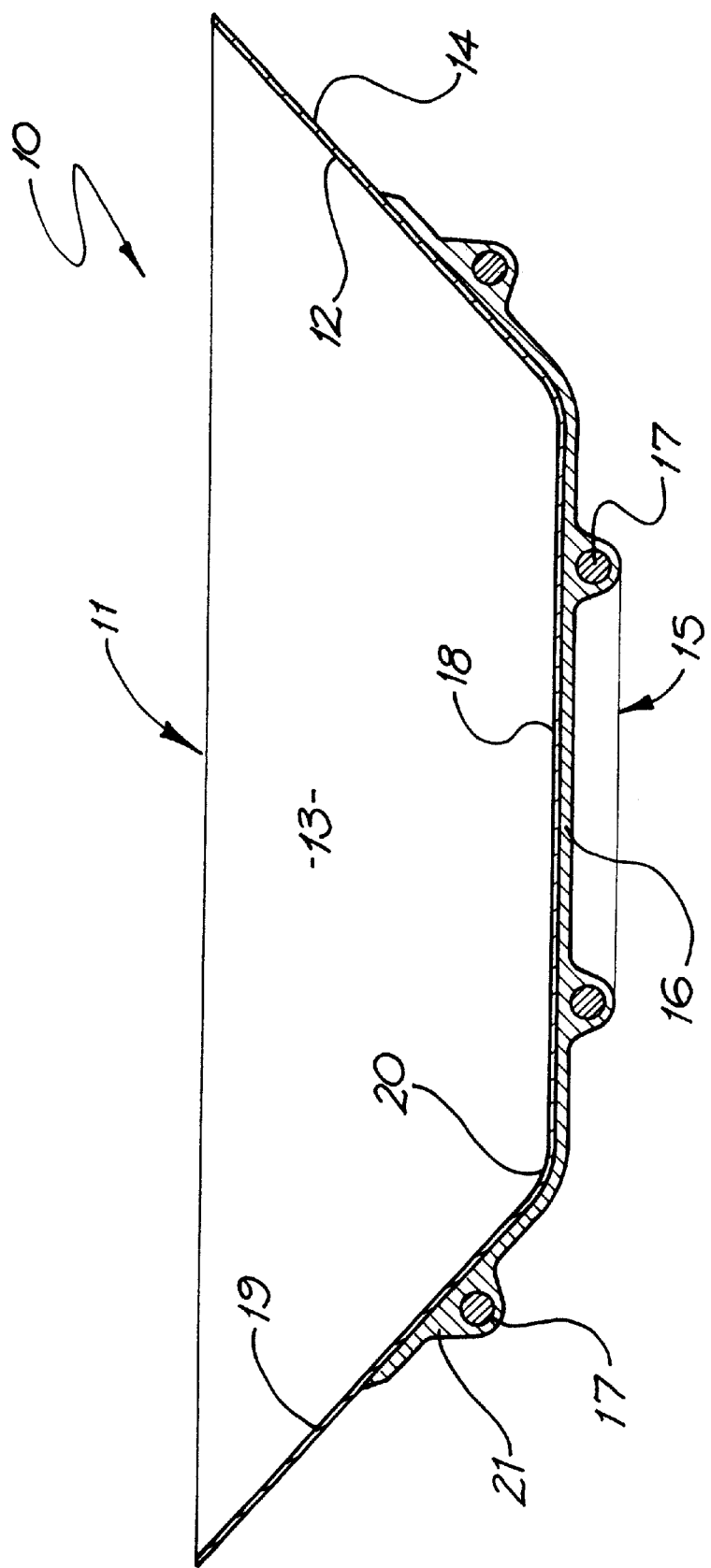
FIG. 4 is a further sectioned side elevation of a cooking utensil.

In the embodiments of FIGS. 3 and 4, the same reference numerals have been employed as those used in the description of the embodiments of FIGS. 1 and 2. However, in FIG. 3, the bowl 11 is "U-shaped" in transverse cross-section so as to have a flat floor 18 joined to a side wall 19 by means of a curved portion 20. The wall 19 is generally perpendicular to the floor 18. As can be noted, the body 16 has a side wall portion 21 which extends past the curved portion 20 of the bowl 11.

In the embodiment of FIG. 4, again the same reference numerals have been employed as those in FIG. 3. However, in this embodiment, the side wall portion 21 is provided with part of the heating element 17.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cooking appliance comprising:

a stainless steel bowl having an inner surface and an outer surface, said outer surface being at least partly non-planar so as to have a portion which is non-planar including a side portion of said outer surface; and a heating base fixed to said outer surface so as to cover at least part of the non-planar portion of said outer surface, said heating base including a cast body fixed to said outer surface and an electric heating element embedded in said body away from said outer surface which when activated causes said base to heat said non-planar portion.

2. The cooking appliance of claim 1 wherein said bowl is arcuate so that said outer surface is arcuate.

3. The cooking appliance of claim 1 wherein said bowl has a floor and side wall extending therefrom, with said floor being generally flat.

4. The cooking appliance of claim 3 wherein said side wall is generally perpendicular to said floor.

5. The cooking appliance of claim 3 wherein said side wall is inclined to said floor.

6. The cooking appliance of claim 3 wherein said heating element is secured to said floor.

7. The cooking appliance of claim 3 wherein said heating element is secured to said floor and side wall.

8. The cooking appliance of claim 3 wherein said side wall is joined to said floor by a curved portion.

* * * * *